United States Patent
Shimada et al.

(10) Patent No.: US 10,102,940 B2
(45) Date of Patent: *Oct. 16, 2018

(54) COMPOSITION FOR ELECTRIC WIRE COATING MATERIAL, INSULATED ELECTRIC WIRE, AND WIRE HARNESS

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Tatsuya Shimada, Mie (JP); Seigou Nakano, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/504,304

(22) PCT Filed: Aug. 3, 2015

(86) PCT No.: PCT/JP2015/071970
§ 371 (c)(1),
(2) Date: Feb. 15, 2017

(87) PCT Pub. No.: WO2016/027651
PCT Pub. Date: Feb. 25, 2016

(65) Prior Publication Data
US 2017/0250002 A1  Aug. 31, 2017

(30) Foreign Application Priority Data

Aug. 22, 2014 (JP) ................ 2014-169315

(51) Int. Cl.
| | |
|---|---|
| H01B 3/00 | (2006.01) |
| H01B 3/44 | (2006.01) |
| C08K 3/22 | (2006.01) |
| C08K 5/03 | (2006.01) |
| C08K 5/09 | (2006.01) |
| C08K 5/13 | (2006.01) |
| C08K 5/3445 | (2006.01) |
| H01B 7/295 | (2006.01) |
| C08F 255/02 | (2006.01) |
| C09D 5/18 | (2006.01) |
| C09D 123/06 | (2006.01) |
| C09D 151/06 | (2006.01) |
| C08K 13/02 | (2006.01) |

(52) U.S. Cl.
CPC .......... *H01B 3/448* (2013.01); *C08F 255/02* (2013.01); *C08F 255/023* (2013.01); *C08K 3/22* (2013.01); *C08K 5/03* (2013.01); *C08K 5/09* (2013.01); *C08K 5/13* (2013.01); *C08K 5/3445* (2013.01); *C09D 5/18* (2013.01); *C09D 123/06* (2013.01); *C09D 151/06* (2013.01); *H01B 3/44* (2013.01); *H01B 3/441* (2013.01); *H01B 7/295* (2013.01); *C08K 13/02* (2013.01)

(58) Field of Classification Search
CPC ........................................ H01B 3/00
USPC ....................... 174/110 R, 110 PM
See application file for complete search history.

(56) References Cited

U.S. PATENT DOCUMENTS

| | | |
|---|---|---|
| 2012/0241190 A1 | 9/2012 | Shimada |
| 2012/0273268 A1 | 11/2012 | Shimada |
| 2012/0292077 A1 | 11/2012 | Sugita |
| 2013/0008691 A1 | 1/2013 | Shimada |

(Continued)

FOREIGN PATENT DOCUMENTS

| | | |
|---|---|---|
| JP | 2000212291 A | 8/2000 |
| JP | 2000294039 A | 10/2000 |
| JP | 2006131720 A | 5/2006 |

(Continued)

OTHER PUBLICATIONS

International Search Report and Written Opinion for Application No. PCT/JP2015/071970 dated Nov. 2, 2015, 8 pages.

(Continued)

*Primary Examiner* — Chau N Nguyen
(74) *Attorney, Agent, or Firm* — Reising Ethington, P.C.

(57) ABSTRACT

Provided is an insulated electric wire, a wire harness, and a composition for an electric wire coating material with which the amount of a filler, which is the flame retardant, can be reduced as much as possible without using electron beam crosslinking, the composition having a high heat resistance, a high gel fraction, flexibility, and good workability of assembling a wire harness. An electric wire coating material is made of a composition comprising (A) a silane-grafted polyolefin obtained by grafting a silane coupling agent onto a polyolefin having a density of 0.855 to 0.885 g/cm$^3$, (B) an unmodified polyolefin having a density of 0.890 to 0.955 g/cm$^3$, (C) a modified polyolefin modified by one or more functional groups selected from a carboxylic acid group, an acid anhydride group, an amino group, an acrylic group, a methacrylic group, and an epoxy group, (D) a bromine-based flame retardant and antimony trioxide, (E) a crosslinking catalyst batch, (F) zinc oxide and an imidazole-based compound, or zinc sulfide, (G) an antioxidant, (H) a metal deactivator, and (I) a lubricant.

6 Claims, No Drawings

(56) References Cited

U.S. PATENT DOCUMENTS

2013/0161064 A1   6/2013  Shimada
2013/0273367 A1  10/2013  Shimada

FOREIGN PATENT DOCUMENTS

| JP | 2011119083 A | 6/2011 |
|---|---|---|
| JP | 2011168697 A | 9/2011 |
| JP | 2011219530 A | 11/2011 |
| JP | 2012241129 A | 12/2012 |
| JP | 2013155269 A | 8/2013 |
| JP | 2014009238 A | 1/2014 |
| WO | WO2012033053 A1 | 3/2012 |
| WO | WO2012105329 A1 | 8/2012 |

OTHER PUBLICATIONS

English Translation of International Search Report for Application No. PCT/JP2015/071970 dated Nov. 2, 2015, 2 pages.

COMPOSITION FOR ELECTRIC WIRE COATING MATERIAL, INSULATED ELECTRIC WIRE, AND WIRE HARNESS

CROSS REFERENCE TO RELATED APPLICATIONS

This application claims the priority of Japanese patent application JP2014-169315 filed on Aug. 22, 2014, the entire contents of which are incorporated herein.

TECHNICAL FIELD

The present invention relates to a composition for an electric wire coating material, an insulated electric wire, and a wire harness, and more specifically relates to a composition for an electric wire coating material that is suitable as a coating material for an insulated electric wire used in a location that needs to be highly heat resistant, such as a wire harness of an automobile, an insulated electric wire, and a wire harness.

BACKGROUND ART

In recent years, due to the spread of hybrid cars and the like, electric wires, connectors, and the like, which are automobile components, have been required to be highly voltage resistant and highly heat resistant. Conventionally, a crosslinked vinyl chloride resin electric wire or a crosslinked polyolefin electric wire has been used as an insulated electric wire used in a place having a high temperature, such as a wire harness of an automobile and the like. Electron beam crosslinking has mainly been used as the method for crosslinking these insulated electric wires (for example, see JP 2000-294039A Patent Document 1).

However, there has been a problem in that electron beam crosslinking requires an expensive electron beam crosslinking apparatus and the like, and high equipment cost, and thus manufacturing cost increases. In view of this, silane crosslinking, with which crosslinking is possible with inexpensive equipment, has been receiving attention. A polyolefin composition is known which is used in a coating material for an electric wire, a cable, and the like and can be subjected to silane crosslinking (for example, see JP 2000-212291A and JP 2006-131720A Patent Documents 2 and 3).

SUMMARY OF INVENTION

In order to satisfy flame-retardancy, which is a main essential characteristic of electric wires for automobiles, it is necessary to add a filler that is the flame retardant to a silane crosslinked polyolefin composition. An inorganic flame retardant has been problematic in that a large amount of the inorganic flame retardant represented by metal hydroxide needs to be added, but if added, mechanical characteristics of a coating material will decrease. If a halogen-based organic flame retardant that has a high flame retardant effect is used as the flame retardant instead of the metal hydroxide, then a gel fraction, which is an index for the degree of crosslinking, easily decreases.

Crosslinking of the silane crosslinking material is promoted by moisture in the air during hot molding, and thus is also called "water crosslinking". Thus, there is a concern that foreign matter will form during hot molding, and it is necessary to reduce the number of instances of a heating step as much as possible. In view of this, in general, flame retardant components in the composition is made into a master batch using a non-silane resin, and then are mixed with a silane crosslinked polyolefin. However, because the non-silane resin is an uncrosslinked resin, if the non-silane resin is added, the degree of crosslinking of the crosslinked resin decreases. If the degree of crosslinking of the crosslinked resin decreases, heat resistance, (degree of crosslinking) a gel fraction, and the like decrease, and it is difficult to satisfy standards for automobiles.

Also, in recent years, because the diameter of an electric wire has increased accompanying an increase in voltage and electric current of an automobile, the electric wire hardens and workability of assembling a wire harness decreases. On the other hand, if a soft resin is used for a coating material, the affinity to an organic solvent used in an automobile, such as gasoline or light oil, increases, and there has been a problem that the electric wire easily swells.

The present application aims to provide a composition for an electric wire coating material with which the amount of a filler, which is the flame retardant, can be reduced as much as possible without using electron beam crosslinking, the composition having a high heat resistance, a high gel fraction, flexibility, and good workability of assembling a wire harness, and the present invention aims to provide an insulated electric wire and a wire harness.

In order to resolve the above-described issues, mainly, a composition for an electric wire coating material may comprise:

(A) a silane-grafted polyolefin obtained by grafting a silane coupling agent onto a polyolefin having a density of 0.855 to 0.885 g/cm$^3$, (B) an unmodified polyolefin having a density of 0.890 to 0.955 g/cm$^3$, (C) a modified polyolefin modified by one or more functional groups selected from a carboxylic acid group, an acid anhydride group, an amino group, an acrylic group, a methacrylic group, and an epoxy group, (D) a bromine-based flame retardant and antimony trioxide, (E) a crosslinking catalyst, (F) zinc oxide and an imidazole-based compound, or zinc sulfide, (G) an antioxidant, (H) a metal deactivator, and (I) a lubricant.

In the composition for an electric wire coating material, as for the (A) silane-grafted polyolefin, a polyolefin before silane grafting may have a density of 0.865 to 0.885 g/cm$^3$, a degree of crystallinity of 10 to 25%, a melt flow rate at 190° C. and a load of 2.16 kg of 0.5 to 5 g/10 minutes, a Shore A hardness of 55 to 80, and a flexural modulus of 3 to 50 MPa, and a gel fraction of the silane-grafted polyolefin is 80 to 95%, as for the (B) unmodified polyolefin, a melt flow rate at 190° C. and a load of 2.16 kg is 0.5 to 5 g/10 minutes, a flexural modulus is 50 to 1000 MPa, and a density is 0.910 to 0.930 g/cm$^3$, the (D) bromine-based flame retardant has a melting point of 200° C. or more, or is either ethylene bis(tetrabromophthalimide) or ethylene bis(pentabromophenyl), the (G) antioxidant is hindered phenol having a melting point of 200° C. or more, the (H) metal deactivator is a salicylic acid derivative, and the (I) lubricant is one or more selected from derivatives of erucic acid, oleic acid, and stearic acid, or polyethylene-based paraffin wax.

According to one embodiment, the composition for an electric wire coating material comprises:

the (A) silane-grafted polyolefin in an amount of 30 to 90 parts by mass, the (B) unmodified polyolefin and the (C) modified polyolefin in an amount of 10 to 70 parts by mass in total, with respect to 100 parts by mass of the total of the (A), (B), and (C), the (D) bromine-based flame retardant and antimony trioxide in an amount of 10 to 70 parts by mass in total, as the (E) crosslinking catalyst, a crosslinking catalyst batch in an amount of 2 to 20 parts by mass, the crosslinking catalyst batch comprising a dispersion containing the crosslinking catalyst in an amount of 0.5 to 5 parts by mass with respect to 100 parts by mass of the polyolefin, the (F) zinc oxide and imidazole-based compound each in an amount of 1 to 15 parts by mass, or zinc sulfide in an amount of 1 to 15 parts by mass, the (G) antioxidant in an amount of 1 to 10 parts by mass, the (H) metal deactivator in an amount of 1 to 10 parts by mass, and the (I) lubricant in an amount of 1 to 10 parts by mass.

In the composition for an electric wire coating material, it may be preferable that the silane-grafted polyolefin and the unmodified polyolefin are one or more selected from very-low-density polyethylene, linear low-density polyethylene, and low-density polyethylene.

An insulated electric wire includes an electric wire coating material obtained by subjecting the composition for an electric wire coating material to water crosslinking.

In the insulated electric wire, it may be preferable that the composition for an electric wire coating material comprises an a component containing the (A) silane-grafted polyolefin, a b component containing the (B) unmodified polyolefin, the (C) modified polyolefin, the (D) bromine-based flame retardant and antimony trioxide, the (F) zinc oxide and imidazole-based compound, or zinc sulfide, the (G) antioxidant, the (H) metal deactivator, and the (I) lubricant, and a c component containing the crosslinking catalyst batch of the (E) crosslinking catalyst, the a component, the b component, and the c component being mixed and molded as the electric wire coating material, and the molded electric wire coating material being subjected to water crosslinking.

A wire harness may include the above-described insulated electric wire.

Since the present application discloses the composition for an electric wire coating material containing the (A) to (I) components, it is possible to obtain an insulated electric wire, a wire harness, and a composition for an electric wire coating material, for which it is possible to use water crosslinking for which inexpensive equipment is used without using electron beam crosslinking for which expensive equipment is used, the composition having a high gel fraction, excellent heat resistance, and flexibility, having good workability when the electric wire is handled, and not reducing chemical resistance, and with the composition, the amount of a filler, which is the flame retardant, can be reduced as much as possible.

DESCRIPTION OF EMBODIMENTS

Hereinafter, an embodiment of the present invention will be described in detail. Examples of ungrafted polyolefin (also referred to as "base resin") that is used in the (A) silane-grafted polyolefin, the (B) unmodified polyolefin, an unmodified polyolefin (base resin) that is used in the (C) modified polyolefin modified by a functional group include the following.

Examples of the above-described polyolefin include polyethylene, polypropylene, homopolymers of other olefins, ethylene-based copolymers such as ethylene-α olefin copolymers, ethylene-vinyl acetate copolymers, ethylene-acrylic acid ester copolymers, and ethylene-methacrylic acid ester copolymers, propylene-based copolymers such as propylene-α olefin copolymers, propylene-vinyl acetate copolymers, propylene-acrylic acid ester copolymers, and propylene-methacrylic acid ester copolymers. These may be used alone or in combination. Polyethylene, polypropylene, ethylene-vinyl acetate copolymers, ethylene-acrylic acid ester copolymers, and ethylene-methacrylic acid ester copolymers are preferable.

Examples of the above-described polyethylene include high-density polyethylene (HDPE), middle-density polyethylene (MDPE), low-density polyethylene (LDPE), linear low-density polyethylene (LLDPE), very-low-density polyethylene (VLDPE), and metallocene very-low-density polyethylene. These may be used alone or in combination. A polyolefin is preferably low-density polyethylene represented by metallocene very-low-density polyethylene. If low-density polyethylene is used, the electric wire will have good flexibility and excellent extrudability, and the productivity will increase.

Also, a polyolefin elastomer obtained by using olefin as the base may be used as the above-described polyolefin. The polyolefin elastomer can provide a coating film with flexibility. Examples of the polyolefin elastomer include olefin-based thermoplastic elastomers (TPO) such as ethylene-based elastomers (PE elastomers) and propylene-based elastomers (PP elastomers), ethylene-propylene copolymers (EPM, EPR), and ethylene propylene-diene copolymers (EPDM, EPT).

A polyolefin used in the (A) silane-grafted polyolefin has a density of 0.855 to 0.885 $g/cm^3$. Although a silane coupling agent is easily grafted onto a polyolefin having a lower density, if the density is less than 0.855 $g/cm^3$, the heat resistance, chemical resistance, and abrasion resistance of the electric wire are likely to decrease, and blocking of pellets will easily occur. Also, it is difficult to manufacture a polyolefin having a density of less than 0.855.

On the other hand, if the density of a polyolefin exceeds 0.885 $g/cm^3$, there is a risk that the gel fraction will decrease due to a decrease in the graft rate, and the flexibility will decrease due to an increase in density. The density of a polyolefin used in the silane-grafted polyolefin is preferably 0.865 to 0.885 $g/cm^3$.

In the present application, the density of the polyolefin is a value measured in conformity with D790 of ASTM standards.

Also, the degree of crystallinity of a polyolefin has a correlational relationship with the density, and a polyolefin having a low degree of crystallinity has a low density, whereas a polyolefin having a high degree of crystallinity has a high density. A preferable degree of crystallinity of a polyolefin used in the silane-grafted polyolefin is in a range of 10 to 25%.

The enthalpy of fusion of a resin pellet is measured using a differential scanning calorimeter, and in the case of a polyethylene-based resin, the degree of crystallinity of the polyolefin of the present invention is a value calculated based on a perfect crystal theoretical enthalpy literature value of 293 J/g for high-density polyethylene (HDPE), whereas in the case of polypropylene-based resin, it is calculated based on 209 J/g for homopolypropylene. Product name "DSC6200" manufactured by Hitachi High-Tech Science Corporation was used as the above-described differential scanning calorimeter.

A melt flow rate (also referred to as MFR hereinafter) at 190° C. and a load of 2.16 kg of the polyolefin used in the silane-grafted polyolefin is preferably 0.5 to 5 g/10 minutes. Defining the MFR of the polyolefin contributes to the moldability of an electric wire and a mixed coating material. If the MFR of the silane-grafted polyolefin is less than 0.5 g/10 minutes, there is a risk that the extrudability will decrease, and the productivity per unit time will decrease. On the other hand, if the MFR exceeds 5 g/10 minutes, there is a risk that a resin will easily drip when the electric wire is molded, for example, and the productivity will decrease, and there is a concern that the abrasion resistance and heat resistance will decrease due to a decrease in the molecular weight. In the present application, MFR is a value measured in conformity with D1238 of ASTM standards.

A Shore A hardness of the polyolefin that is the base resin of the silane-grafted polyolefin is in a range of 55 to 80. The Shore A hardness is a value measured in conformity with D2240 of ASTM standards. Also, a flexural modulus of the above-described polyolefin is preferably in a range of 3 to 50 MPa. The flexural modulus is a value measured at normal temperature in conformity with D790 of ASTM standards. Specifying the Shore A hardness and flexural modulus of the polyolefin in the above-described ranges contributes to improvement of the flexibility and abrasion resistance of the electric wire, for example.

The (A) silane-grafted polyolefin preferably has a gel fraction of 80 to 95%. If the gel fraction is in the above-described range, the heat resistance, the chemical resistance, and the like are further increased.

In the present application, the gel fraction of the silane-grafted polyolefin can be obtained with a measurement method below. First, a blend material obtained by adding 5 parts by mass of a crosslinking catalyst batch (the detail is described in section "Working Examples") to 100 parts by mass of the silane-grafted polyolefin is mixed with a "Labo Plastomill" manufactured by TOYO SEIKI CO., LTD. at 200° C. for 5 minutes and the obtained mass-like substance is subjected to compression pressing at 200° C. for 3 minutes to mold a sheet having a thickness of 1 mm. After the obtained molded sheet was subjected to water crosslinking in the conditions of 60° C., 12 hours, and 95% humidity, 0.1 g was collected from the obtained molded sheet, used as a test piece, and weighed to obtain the mass of the test piece before immersion in xylene. Next, the test piece was immersed in a xylene solvent having a temperature of 120° C. and removed therefrom after 20 hours, the removed test piece was dried at 100° C. for 6 hours, and then the dried test piece was weighed to obtain the mass of the test piece after immersion in xylene. The gel fraction was obtained by the equation below using a percentage of the mass after the test piece was immersed in the xylene solvent with respect to the mass before immersion.

Gel fraction %=(the mass after immersion in xylene/ the mass before immersion in xylene)×100

Examples of the silane coupling agent used in the (A) silane-grafted polyolefin include vinyl alkoxysilanes such as vinyltrimethoxysilane, vinyltriethoxysilane, and vinyltributoxysilane, n-hexyltrimethoxysilane, vinylacetoxysilane, γ-methacryloxypropyltrimethoxysilane, and γ-methacryloxypropylmethyldimethoxysilane. These may be used alone or in combination.

A blending amount of the silane coupling agent in the (A) silane-grafted polyolefin is preferably in a range of 0.5 to 5 parts by mass, and more preferably in a range of 3 to 5 parts by mass with respect to 100 parts by mass of the polyolefin onto which the silane coupling agent is grafted. If the blending amount of the silane coupling agent is less than 0.5 parts by mass, the graft amount of the silane coupling agent is too small to obtain a sufficient degree of crosslinking during silane crosslinking. On the other hand, if the blending amount of the silane coupling agent exceeds 5 parts by mass, a crosslinking reaction advances excessively during mixing, and a gel-like substance is easily produced. Then, unevenness easily occurs on the product surface, and mass productivity easily decreases. Also, a melt viscosity increases excessively, excessive load is applied to an extruder, and workability easily decreases.

From the viewpoint of production of foreign matter due to excessive crosslinking in an electric wire coating step and the like, an upper limit of the graft amount (a percentage of the mass of the grafted silane coupling agent with respect to the mass of the polyolefin before silane grafting) of the silane coupling agent is preferably 15 mass % or less, more preferably 10 mass % or less, and even more preferably 5 mass % or less. On the other hand, from the viewpoint of the degree of crosslinking (gel fraction) in the electric wire coating, a lower limit of the above-described graft amount is preferably 0.1 mass % or more, more preferably 1 mass % or more, and even more preferably 2.5 mass % or more.

In general, a method of adding a free radical generating agent to a polyolefin and a silane coupling agent, and mixing the mixture with a twin-screw extruder or single screw extruder is used as a method for manufacturing a silane-grafted polyolefin by grafting the silane coupling agent onto the polyolefin. In addition, when the polyolefin is polymerized, a method of adding a silane coupling agent may be used.

The silane-grafted polyolefin onto which the silane coupling agent is grafted is held as a silane graft batch (a component), and is stored separately from another flame retardant batch (b component) and catalyst batch (c component), which will be described later, until the composition is mixed.

Examples of the above-described free radical generating agent include organic peroxides such as dicumyl peroxide (DCP), benzoyl peroxide, dichlorobenzoyl peroxide, di-tert-butyl peroxide, butyl peracetate, tert-butyl perbenzoate, and 2,5-dimethyl-2,5-di(tert-butyl peroxide) hexane. The free radical generating agent is not limited to the above examples, and other peroxides and radical generating agents may be used.

Dicumyl peroxide (DCP) is more preferable as the free radical generating agent. If dicumyl peroxide (DCP) is used as the free radical generating agent, a temperature at which a silane graft batch is prepared when the silane coupling agent is graft-polymerized onto the polyolefin is set to 120° C. or more, and more preferably 160° C. or more. This is because the graft efficiency is good and the reaction time is shortened.

The blending amount of the free radical generating agent is preferably in a range of 0.025 to 0.5 parts by mass with respect to 100 parts by mass of the polyolefin that is subjected to silane modification. If the blending amount of the free radical generating agent is less than 0.025 parts by mass, a grafting reaction of the silane coupling agent is unlikely to advance sufficiently, and a desired gel fraction is unlikely to be obtained. On the other hand, if the blending amount of the free radical generating agent exceeds 0.5 parts by mass, a polyolefin molecule is cleaved or the ratio of crosslinks of polyolefin molecules increases, and unintended peroxide crosslinking or deterioration easily advances. Then, the crosslinking reaction of the polyolefin advances excessively, unevenness easily occurs on a product surface when the polyolefin is mixed with the flame retardant batch or the catalyst batch, and there is a risk that the workability will decrease or the external appearance will deteriorate.

Also, the above-described free radical generating agent may be diluted with an inert substance such as talc or calcium carbonate, or may be diluted with ethylene-propylene rubber, ethylene-propylene-diene rubber, or polyolefin-α olefin copolymers, and then may be formed into a pellet.

A polyolefin that is not modified by a silane coupling agent, a functional group, or the like is used as the (B) unmodified polyolefin. The unmodified polyolefin having a density of 0.890 to 0.955 g/cm$^3$ is used. If the density of the unmodified polyolefin is less than 0.890 g/cm$^3$, the heat resistance, chemical resistance, abrasion resistance, and the like of the electric wire easily decrease. Also, if the density of the unmodified polyolefin exceeds 0.955 g/cm$^3$, the flexibility decreases. A more preferable density of the unmodified polyolefin is in a range of 0.910 to 0.930 g/cm$^3$.

The (B) unmodified polyolefin preferably has an MFR of 0.5 to 5 g/10 minutes at 190° C. and a load of 2.16 kg. Similarly to the defining of the MFR of the silane-grafted polyolefin, if the MFR of the unmodified polyolefin is less than 0.5 g/10 minutes, there is a risk that the extrudability will decrease, and the productivity per unit time will decrease. On the other hand, if the MFR exceeds 5 g/10 minutes, there is a risk that a resin will easily drop when the electric wire is molded, for example, and the productivity will decrease, and there is a concern that the abrasion resistance and heat resistance will decrease due to a decrease in the molecular weight.

A resin that is in the same series as those of the resin used as the unmodified polyolefin is preferably used as the polyolefin used in the (C) functional group modified polyolefin because of the compatibility, and due to the reason that polyethylene such as VLDPE and LDPE contributes to the flexibility of the electric wire and makes fillers that are the flame retardant disperse well.

The functional groups used in the (C) functional group modified polyolefin are one or more selected from a carboxylic acid group, an acid anhydride group, an amino group, an acrylic group, a methacrylic group, and an epoxy group. Among the above-described functional groups, a maleic acid group, an epoxy group, an amino group, and the like are preferable. This is because the adhesiveness with fillers such as bromine-based flame retardants, antimony trioxide, and zinc oxide increases due to these functional groups, and the strength of resin is unlikely to decrease. Also, the ratio of modified functional groups is preferably in a range of 0.05 to 10 parts by mass with respect to 100 parts by mass of the polyolefin. If the ratio exceeds 10 parts by mass, there is a risk that the coating stripping properties during terminal end processing will decrease. If the ratio is less than 0.5 parts by mass, there is a risk that the effect of modification by functional groups will be insufficient.

Specific examples of a method for modifying a polyolefin with functional groups include a method for graft-polymerizing a compound having functional groups onto the polyolefin and a method for copolymerizing a compound having functional groups and olefin monomer to obtain an olefin copolymer.

Specific examples of the compound for introducing a carboxyl group and an acid anhydride group as the functional groups include α, β-unsaturated dicarboxylic acids such as maleic acid, fumaric acid, citraconic acid, and itaconic acid, and anhydrides thereof, unsaturated monocarboxylic acids such as acrylic acid, methacrylic acid, furan acid, crotonic acid, vinyl acetic acid, and pentenoic acid.

Specific examples of the compound for introducing an amino group as the functional group include aminoethyl (meth)acrylate, propylaminoethyl (meth)acrylate, dimethylaminoethyl (meth)acrylate, diethylaminoethyl (meth)acrylate, dibutylaminoethyl (meth)acrylate, aminopropyl (meth)acrylate, phenylaminoethyl (meth)acrylate, and cyclohexylaminoethyl (meth)acrylate.

Specific examples of the compound for introducing an epoxy group as the functional group include glycidyl esters such as glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, α-chloroacrylic acid, maleic acid, crotonic acid, and fumaric acid, glycidyl ethers such as vinyl glycidyl ether, allyl glycidyl ether, glycidyloxyethyl vinyl ether, and styrene-p-glycidyl ether, and p-glycidyl styrene.

Blending ratios of the above-described resin components (A) to (C) in the case where the sum of the resin components is 100 parts by mass are such that the (A) silane-grafted polyolefin is 30 to 90 parts by mass, and the sum of the (B) unmodified polyolefin and the (C) modified polyolefin is 10 to 70 parts by mass. The blending ratio of the (B) unmodified polyolefin and the (C) modified polyolefin is preferably in a range of (B):(C)=95:5 to 50:50 because of excellent compatibility and an increase in the productivity and dispersiveness of the flame retardant.

Among the (D) bromine-based flame retardants and antimony trioxide, bromine-based flame retardants having a phthalimide structure such as ethylene bis(tetrabromophthalimide), ethylene bis(tribromophthalimide) or ethylene bis(pentabromophenyl) are suitable as the bromine-based flame retardants. These flame retardants have lower solubilities in hot xylene than that of the others, and thus have good gel fractions, high melting points, and excellent heat resistance. It is preferable that the bromine-based flame retardant has a melting point of 200° C. or more, or is either ethylene bis(tetrabromophthalimide) or ethylene bis(pentabromophenyl).

The above-described phthalimide-based bromine-based flame retardant or ethylene bis(pentabromophenyl) may be used alone as the bromine-based flame retardant, or may be used in combination with the following bromine-based flame retardants. Specific examples include ethylene bis (pentabromobenzene) (synonym: bis(pentabromophenyl)ethane), tetrabromobisphenol A (TBBA), hexabromocyclododecane (HBCD), TBBA-carbonate oligomers, TBBA-epoxy oligomers, brominated polystyrene, TBBA-bis (dibromopropyl ether), poly (dibromopropyl ether), and hexabromobenzene (HBB). It is sufficient to use only these flame retardants in order to only provide the electric wire with flame-retardancy, but in order to provide the electric wire with a sufficient gel fraction or heat resistance, it is preferable to use them in combination with a phthalimide-based flame retardant.

Antimony trioxide of the (D) bromine-based flame retardant and antimony trioxide is used as a flame retardant auxiliary agent for the bromine-based flame retardant, synergistic effects can be obtained by combining with the bromine-based flame retardant, and the flame-retardancy can be further improved. Antimony trioxide having a purity of 99% or more is preferably used. Antimony trioxide that is produced as a mineral is subjected to pulverization treatment to be formed into minute particles, and the formed minute particles are used. At this time, an average particle size is preferably 3 µm or less, and is more preferably 1 µm or less. If the average particle size of antimony trioxide increases, there is a risk that the strength of an interface with the resin will decrease. Also, for the purpose of controlling the particle size and improving the strength of the interface with the resin, antimony trioxide may be subjected to surface treatment. A silane coupling agent, higher fatty acid, polyolefin wax, or the like is preferably used as a surface treatment agent.

In the (D) bromine-based flame retardant and antimony trioxide, a mixing ratio of the bromine-based flame retardant and antimony trioxide preferably has an equivalence ratio in a range of bromine-based flame retardant:antimony trioxide=3:1 to 2:1.

The blending amount of the (D) bromine-based flame retardant and antimony trioxide is preferably in a range of 10 to 70 parts by mass in the total amount of the bromine-based flame retardant and antimony trioxide, and more preferably in a range of 20 to 60 parts by mass, with respect to a total of 100 parts by mass of the above-described resin components (A) to (C). If the blending amount of the flame retardant components is less than 10 parts by mass, there is a risk that the electric wire will have insufficient flame-retardancy, whereas if the blending amount exceeds 70 parts by mass, there is a risk that the flame retardant will aggregate due to mixing failure, the strength of the interface between the flame retardant and the resin will decrease, and the mechanical characteristics of the electric wire will decrease.

The (E) crosslinking catalyst contains a silanol condensation catalyst for silane-crosslinking a silane-grafted polyolefin. Examples of the crosslinking catalyst include carboxylates of metals such as tin, zinc, iron, lead, and cobalt, titanic acid esters, organic bases, inorganic acids, and organic acids. Specific examples thereof include dibutyltin dilaurate, dibutyltin dimaleate, dibutyltin mercaptide (dibutyltin bisoctylthioglycol ester, dibutyltin β-mercaptopropionate polymer, etc.), dibutyltin diacetate, dioctyltin dilaurate, stannous acetate, stannous caprylate, lead naphthenate, cobalt naphthenate, barium stearate, calcium stearate, tetrabutyl titanate, tetranonyl titanate, dibutylamine, hexylamine, pyridine, sulfuric acid, hydrochloric acid, toluene sulfonic acid, acetic acid, stearic acid, and maleic acid. Dibutyltin dilaurate, dibutyltin dimaleate, dibutyltin mercaptide, and the like are preferable as the crosslinking catalyst.

If the (E) crosslinking catalyst is directly mixed into a silane graft batch (a component) containing the silane-grafted polyolefin, crosslinking advances, and thus it is added in a step of coating the electric wire. The (E) crosslinking catalyst is preferably configured as a crosslinking catalyst batch obtained by mixing the crosslinking catalyst and a binder resin. Use of the above-described crosslinking catalyst as the crosslinking catalyst batch can suppress excessive reactions that may occur due to being mixed with the flame retardant, and the addition amount of catalyst can be easily controlled. The crosslinking catalyst batch alone can be used as the c component. Also, the c component may be prepared by adding other components to the crosslinking catalyst batch in a range such that the purpose is not hindered.

A polyolefin is suitable as the binder resin used in the above-described crosslinking catalyst batch, and in particular, LDPE, LLDPE, VLDPE, and the like are preferable. This is for the same reason as the reason for selecting a polyolefin such as a silane-grafted polyolefin, an unmodified polyolefin, or a modified polyolefin. Also, in terms of the compatibility, it is preferable to use a resin that is in the same series as the silane-grafted polyolefin, the unmodified polyolefin, and the modified polyolefin. An example of the resin that can be used in the crosslinking catalyst batch includes the polyolefin illustrated as the base resins of the above-described (A) to (C) components.

The blending ratio of the crosslinking catalyst in the crosslinking catalyst batch is preferably in a range of 0.5 to 5 parts by mass, and more preferably in a range of 1 to 5 parts by mass, with respect to 100 parts by mass of the resin components in the crosslinking catalyst batch. If the blending ratio is less than 0.5 parts by mass, the crosslinking reaction may be unlikely to progress, if the blending ratio exceeds 5 parts by mass, depressiveness of catalysts may decrease, and if the blending ratio is less than 1 parts by mass, the reactivity may decrease. Also, if the blending ratio of the crosslinking catalyst exceeds 5 parts by mass, there is a risk that the surface of the electric wire will deteriorate due to an excessive crosslinking reaction during molding processing, physical properties such as flexibility, heat resistance, abrasion resistance, and the like will deteriorate due to aggregation of the catalytic components.

The (E) crosslinking catalyst batch is desirably added in a range of 2 to 20 parts by mass, and more preferably added in a range of 5 to 15 parts by mass, with respect to a total of 100 parts by mass of the above-described (A) to (C) resin components. In the case of containing less than 2 parts by mass, crosslinking is unlikely to progress, partial crosslinking may occur, and in the case of containing more than 20 parts by mass, the flame-retardancy and weatherability may decrease due to an increase in the ratio of non-crosslinkable resin and non-flame-retardant resin in the components.

(F) Zinc oxide and an imidazole-based compound, or zinc sulfide are used as additive agents for improving heat resistance. Either the addition of only zinc sulfide or the combination of zinc oxide and the imidazole-based compound can achieve a similar heat resistance effect.

The above-described zinc oxide can be obtained with a method of oxidizing, with air, zinc vapor generated by adding a reducing agent such as coke to a zinc ore and firing the mixture, or a method of using zinc sulfate or zinc chloride as the salt amount. There is no particular limitation on the method of manufacturing zinc oxide, and zinc oxide may be manufactured with any method. Also, zinc sulfide manufactured with a known method can be used. Average particle sizes of zinc oxide and zinc sulfide are preferably 3 µm or less, and more preferably 1 µm or less. If the average particle sizes of zinc oxide and zinc sulfide decrease, the strength of the interface with the resin increases and the dispersiveness also increases.

Mercaptobenzimidazoles are preferable as the above-described imidazole-based compound. Examples of the mercaptobenzimidazoles include 2-mercaptobenzimidazole, 2-mercaptomethylbenzimidazole, 4-mercaptomethylbenzimidazole, 5-mercaptomethylbenzimidazole, and zinc salts thereof 2-mercaptobenzimidazole and zinc salts thereof are particularly preferable as mercaptobenzimidazole because it is stable at high temperature due to a high melting point and less sublimation during mixing.

If zinc sulfide, or zinc oxide and the imidazole-based compound are added in small amounts, there is a risk that the heat resistance improvement effect will not be obtained sufficiently, and if they are added in large amounts, there is a risk that particles will be likely to aggregate, the external appearance of the electric wire will decrease, and mechanical properties such as abrasion resistance will decrease, and thus the addition amounts are preferably in the following range. It is preferable to add zinc sulfide in an amount of 1 to 15 parts by mass, or zinc oxide and the imidazole-based compound respectively in an amount of 1 to 15 parts by mass with respect to a total of 100 parts by mass of the above-described (A) to (C) resin components.

A hindered phenol-based antioxidant is preferably used as the (G) antioxidant, and in particular, hindered phenol having a melting point of 200° C. or more is preferable. Examples of the hindered phenol-based antioxidant include pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3,5-di-tert-butyl-4-hydroxyphenylpropionamide), benzenepropanoic acid, 3,5-bis(1,1-dimethylethyl)-4-hydroxy, C7-C9 side chain alkyl esters, 2,4-dimethyl-6-(1-methylpentadecyl) phenol, diethyl[[3,5-bis(1,1-dimethylethyl)-4-hydroxyphenyl]methyl] phosphonate, 3,3',3",5,5', 5"-hexa-tert-butyl-a,a',a"-(mesitylene-2,4,6-triyl)tri-p-cresol, calcium diethyl bis[[[3,5-bis(1,1-dimethylethyl)-4-hydroxyphenyl]methyl]phosphonate], 4,6-bis(octylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl) propionate, 1,3,5-tris(3,5-di-tert-butyl-4-hydroxybenzyl)-1, 3,5-triazine-2,4,6(1H, 3H, 5H)-trione, 1,3,5-tris[(4-tert-butyl-3-hydroxy-2,6-xylyl)methyl]-1,3,5-triazine-2,4,6 (1H, 3H, 5H)-trione, 2,6-tert-butyl-4-(4,6-bis(octylthio)-1,3,5-triazin-2-ylamino)phenol, 2,6-di-tert-butyl-4-methylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), and 3,9-bis[2-(3-(3-tert-butyl-4-hydroxy-5-methylphenyl)propionicacid-1,1-dimethylethyl]-2,4,8,10-tetraoxaspiro(5,5)undecane. These may be used alone or in combination. Examples of the hindered phenol-based antioxidant having a melting point of 200° C. or more include 3,3',3",5,5'5"-hexa-tert-butyl-a,a',a"-(mesitylene-2, 4,6-triyl)tri-p-cresol, and 1,3,5-tris(3,5-di-tert-butyl-4-hydroxybenzyl)-1,3,5-triazine-2,4,6(1H,3H,5H)-trione.

In the case where the sum (A)+(B)+(C)=100 parts by mass of the (A) to (C) components, which are the above-described resin components, the addition amount of the (G) antioxidant is preferably in a range of 1 to 10 parts by mass, and more preferably in a range of 1 to 5 parts by mass. If the addition amount of the (G) antioxidant is in the above-described range, the electric wire has excellent ageing characteristics and it is possible to suppress blooming and the like that occur when a large amount of the antioxidant is added.

A copper deactivator, a chelating agent, or the like that can prevent oxidation caused by contact with a heavy metal such as copper is used as the (H) metal deactivator. Examples of the metal deactivator include hydrazide derivatives such as 2,3-bis{3-(3,5-di-tert-butyl-4-hydroxyphenyl) propionyl}propionohydrazide and salicylic acid derivatives. Salicylic acid derivatives such as 3-(N-salicyloyl)amino-1, 2,4-triazole are preferable as the metal deactivator. The heat resistance is improved due to the composition containing the (H) metal deactivator.

In the case where the sum (A)+(B)+(C)=100 parts by mass of (A) to (C) components, which are the above-described resin components, the addition amount of the (H) metal deactivator is preferably in a range of 1 to 10 parts by mass. The addition amount is more preferably in a range of 1 to 5 parts by mass. If the addition amount of the (H) metal deactivator is in the above-described range, the metal deactivator and the crosslinking catalyst react with each other, and there is an advantage in that it is possible to prevent crosslinking of silane grafted resin from being hindered.

A lubricant used in this type of electric wire coating material can be used as the (I) lubricant. Either an internal lubricant or external lubricant may be used as the lubricant. Examples of the lubricant include hydrocarbons such as liquid paraffin, paraffin wax, and synthetic polyethylene wax, fatty acids, higher alcohols, fatty acid amides such as stearic acid amides, oleic acid amides, and erucic acid amides, alkylene fatty acid amides such as methylene bis stearamides, and ethylene bis stearamides, and metal soaps such as metal stearates, and ester-based lubricants such as monoglyceride stearate, stearyl stearate, and hardened oil. From the viewpoint of compatibility with a polyolefin, derivatives of erucic acid, oleic acid, and stearic acid, or polyethylene-based paraffin wax is preferably used as the lubricant.

In the case where the sum (A)+(B)+(C)=100 parts by mass of (A) to (C) components, which are the above-described resin components, the addition amount of the (I) lubricant is preferably in a range of 1 to 10 parts by mass. The addition amount is more preferably in a range of 1 to 5 parts by mass. If the addition amount of the (I) lubricant is in the above-described range, there are advantages in that sufficient lubricant effects are obtained, and the electric wire has a good surface, shearing force at the time of resin mixing processing decreases, and the resin temperature can be reduced.

Inorganic fillers such as magnesium hydroxide, magnesium oxide, and calcium carbonate can be used for the composition for an electric wire coating material in a small amount as an additive agent. By adding the inorganic filler, the hardness of the resin can be adjusted, and workability and high temperature deformation resistance characteristics can be improved. Note that if the above-described filler is added in a large amount, the resin strength easily decreases, and the addition amount of the above-described filler is preferably 30 parts by mass or less, and more preferably 5 parts by mass or less with respect to a total of 100 parts by mass of the resin components.

In addition to the above, general additive agents used in this type of electric wire coating material composition may be blended to the composition for an electric wire coating material in a range such that the purpose of the present application is not hindered.

Hereinafter, an insulated electric wire and a wire harness will be described. In the insulated electric wire, an outer circumference of a conductor is coated with an insulating layer made of a electric wire coating material (also simply referred to as "coating material") obtained by subjecting the above-described composition for an electric wire coating material to water crosslinking. There is no particular limitation on the diameter and the material of the conductor of the insulated electric wire, and the diameter and material thereof can be selected as appropriate in accordance with applications of the insulated electric wire. Examples of the conductor include copper, a copper alloy, aluminum, and an aluminum alloy. Also, the insulating layer of the electric wire coating material may be a single layer or multiple layers having two or more layers.

In the insulated electric wire, the degree of crosslinking of the crosslinked coating material is preferably 50% or more as gel fraction from the viewpoint of heat resistance. More preferably, the gel fraction of the coating material is 60% or more. The gel fraction of the coating material of the insulated electric wire is used as an index that expresses the degree of crosslinking that is a ratio of a general crosslinked electric wire in a crosslinked state. The gel fraction of the coating material can be measured in conformity with JASO-D608-92 that is the gel fraction of a crosslinked electric wire for an automobile, for example.

The degree of crosslinking (gel fraction) of the coating material of the insulated electric wire can be adjusted according to a graft amount of a silane coupling agent in the (A) silane-grafted polyolefin, the type and amount of a crosslinking catalyst, and water crosslinking conditions (temperature, time, and the like).

In order to manufacture the insulated electric wire, it is sufficient that an a component (also referred to as "silane graft batch") containing the (A) silane-grafted polyolefin, a b component (also referred to as "flame retardant batch") containing the (B) unmodified polyolefin, the (C) modified polyolefin, the (D) bromine-based flame retardant and antimony trioxide, the (F) zinc oxide and imidazole-based compound, or zinc sulfide, the (G) antioxidant, the (H) metal deactivator, and the (I) lubricant, and a c component containing the (E) crosslinking catalyst batch are heated and mixed (a mixing step), and the mixture is extruded onto the outer circumference of the conductor to coat the conductor (a coating step), and then is subjected to water crosslinking (a water crosslinking step).

The b component and c component may be mixed to form a pellet in advance, and the b component and c component may be separately formed into pellets. Also, the silane-grafted polyolefin in the a component can be formed into a pellet.

In the above-described mixing step, the pellet-shaped batches are mixed with a mixer, an extruder, or the like. In the coating step, a general extrusion molding machine or the like is used to perform extrusion coating. The water crosslinking step is performed by exposing a coating resin of the coated electric wire to water moisture or water. The water crosslinking step is preferably performed in a temperature range of normal temperature to 90° C. for 48 hours or less. The water crosslinking step is preferably performed at a temperature of 50 to 80° C. for 8 to 24 hours.

The wire harness includes the above-described insulated electric wire. The wire harness may be a single wire bundle obtained by bundling only the insulated electric wire, or a mixed electric wire bundle obtained by bundling the insulated electric wires and other insulated electric wires in a mixed state. The electric wire bundle is configured as the wire harness by bundling electric wires with a wire harness protecting material such as a corrugate tube, a bundle material such as adhesive tape, and the like.

ISO6722 is an international standard used for an electric wire for an automobile. According to this standard, the insulated electric wires are classified into classes A to E in accordance with an allowable heat resistant temperature. The insulated electric wire is made of the electric wire coating material composition, and thus has excellent heat resistance, is optimal for a battery cable to which a high voltage is applied, and can obtain characteristics of class C having a heat resistant temperature of 125° C. or class D having a heat resistant temperature of 150° C.

WORKING EXAMPLES

Hereinafter, working examples and comparative examples will be described. The present invention is not limited by these examples.

Test materials that were used in these working examples and comparative examples will be described along with manufacturers and product names.

Silane-Grafted Polyolefin (Silane-Grafted PE1 to Silane-Grafted PE5, and Silane-Grafted PP1)

A silane-grafted polyolefin was prepared by using base resins having properties shown in Table 1 below as the polyolefin, and mixing, with a single screw extruder having an inner diameter of 25 mm at 160° C., a material obtained by dry-blending 1 to 4 parts by mass of vinyltrimethoxysilane (manufactured by Shin-Etsu Chemical Co., Ltd., product name "KBM1003"), and 0.1 to 0.5 parts by mass of dicumyl peroxide (manufactured by NOF CORPORATION, product name "PERCUMYL-D") with respect to 100 parts by mass of the base resin. A gel fraction of the obtained silane-grafted resin was measured with a method of obtaining the gel fraction from a ratio of mass before and after immersion in xylene after being cured by adding a crosslinking catalyst batch (the same batch as that used in the following working example was used) as described above. The result of measurement of the gel fraction of each silane-grafted polyolefin is also shown in Table 1.

The following resins were used as the base resins that were used in the silane-grafted resins in Table 1.

Silane-grafted PE1: polyethylene (VLDPE) having a density of 0.850

Silane-grafted PE2: product name "ENGAGE 7467" manufactured by Dow Elastomers (VLDPE)

Silane-grafted PE3: product name "ENGAGE 8400" manufactured by Dow Elastomers (VLDPE)

Silane-grafted PE4: product name "ENR7256.02" manufactured by Dow Elastomers (VLDPE)

Silane-grafted PE5: product name "EXCELLEN FX555" manufactured by Sumitomo Chemical Co., Ltd. (LL-DPE)

Silane-grafted PP1: product name "NOVATEC EC9" manufactured by Japan Polypropylene Corporation

TABLE 1

| | | Silane-grafted PE1 | Silane-grafted PE2 | Silane-grafted PE3 | Silane-grafted PE4 | Silane-grafted PE5 | Silane-grafted PP1 |
|---|---|---|---|---|---|---|---|
| Base resin properties | density (g/cm$^3$) | 0.85 | 0.862 | 0.87 | 0.885 | 0.87 | 0.92 |
| | flexural modulus (MPa) | 2.5 | 4 | 13.1 | 27.1 | 5 | 1200 |
| | MFR (g/10 min) | 3 | 1.2 | 1 | 2 | 16 | 0.5 |
| | Shore A hardness | 50 | 56 | 73 | 82 | 67 | (90 or more) |

TABLE 1-continued

|  |  | Silane-grafted PE1 | Silane-grafted PE2 | Silane-grafted PE3 | Silane-grafted PE4 | Silane-grafted PE5 | Silane-grafted PP1 |
| --- | --- | --- | --- | --- | --- | --- | --- |
| Silane-grafted resin properties | degree of crystallinity (%) | 5 | 12 | 18 | 23 | 25 | 90 |
|  | gel fraction (%) | 90 | 85 | 93 | 80 | 96 | 70 |

Unmodified Polyolefin (Unmodified PE1 to Unmodified PE4, Unmodified PP1)

The following resins were used as the unmodified polyolefin. Specific physical properties are shown in Table 2.

Unmodified PE1: product name "ENGAGE 8480" manufactured by Dow Elastomers (VLDPE)

Unmodified PE2: product name "SUMIKATHENE C215" manufactured by Sumitomo Chemical Co., Ltd. (LDPE)

Unmodified PE3: product name "NOVATECH HDHY331" manufactured by Japan Polyethylene Corporation (HDPE)

Unmodified PE4: product name "NOVATECH HDHB530" manufactured by Japan Polyethylene Corporation (HDPE)

Unmodified PP1: product name "NOVATECH EC9" manufactured by Japan Polypropylene Corporation

TABLE 2

|  | Unmodified PE1 | Unmodified PE2 | Unmodified PE3 | Unmodified PE4 | Unmodified PP1 |
| --- | --- | --- | --- | --- | --- |
| Density (g/cm$^3$) | 0.88 | 0.9 | 0.92 | 0.956 | 0.92 |
| Flexural modulus (MPa) | 27.1 | 80 | 150 | 1000 | 1200 |
| MFR (g/10 min) | 0.4 | 1 | 2 | 0.5 | 0.5 |
| Degree of crystallinity (%) | 23 | 33 | 45 | 80 | 90 |

Components Other than the Above

Components other than the above are as follows.

PP elastomer: product name "NEWCON NAR6" manufactured by Japan Polypropylene Corporation Maleic acid-modified PE: product name "MODIC AP512P" manufactured by NOF CORPORATION Epoxy-modified PE: product name "BONDFAST E" manufactured by Sumitomo Chemical Co., Ltd. (E-GMA)

Maleic acid-modified PP: product name "ADMER QB550" manufactured by Mitsubishi Chemical Corporation Methacryl-modified PE: product name "ACRYFT WH102" manufactured by Sumitomo Chemical Co., Ltd.

Bromine-based flame retardant 1: ethylene bis(pentabromobenzene) manufactured by Albemarle Corporation, product name "SAYTEX8010"

Bromine-based flame retardant 2: TBBA-bis(dibromopropyl ether) manufactured by SUZUHIRO CHEMICAL Co., Ltd., product name "FCP-680"

Bromine-based flame retardant 3: ethylene bis(tetrabromophthalimide) manufactured by Albemarle Corporation, product name "SAYTEXBT-93"

Antimony trioxide: product name "antimony trioxide MSW grade" manufactured by YAMANAKA Antioxidant 1: product name "IRGANOX 1010" manufactured by Basf Japan Ltd.

Antioxidant 2: product name "IRGANOX 3114" manufactured by Basf Japan Ltd.

Magnesium hydroxide: product name "KISUMA 5C" manufactured by Kyowa Chemical Industry Co., Ltd.

Calcium carbonate: product name "Vigot15" manufactured by SHIRAISHI CALCIUM KAISHA, LTD.

Metal deactivator: product name "CDA-1" manufactured by ADEKA CORPORATION

Zinc oxide: product name "zinc oxide #2" manufactured by HAKUSUI TECH

Zinc sulfide: product name "SachtolithHD-S" manufactured by Sachtleben Chemie Gmbh Imidazole compound: product name "Antage MB" manufactured by Kawaguchi Chemical Industry Co., Ltd.

Lubricant 1: product name "ALFLOW P10" (erucic acid amide) manufactured by NOF CORPORATION Lubricant 2: product name "ALFLOW S10" (stearic acid amide) manufactured by NOF CORPORATION Lubricant 3: product name "ALFLOW E10" (oleic acid amide) manufactured by NOF CORPORATION Lubricant 4: product name "HI-WAX 110P" (polyethylene wax) manufactured by Mitsui Chemicals, Inc.

Crosslinking catalyst batch: product name "Linklon LZ015H" manufactured by Mitsubishi Chemical Corporation was used as a crosslinking catalyst batch (c component). "Linklon LZ015H" contains polyethylene as the binder resin, and contains a tin compound in an amount of less than 1% as the crosslinking catalyst.

Preparation of Silane-Grafted Batch (a Component)

The a components that are shown in working examples and comparative examples in Table 3 and Table 4 were formed into pellets and used as silane-grafted batches.

Preparation of Flame Retardant Batch (b Component)

Materials having blending amount ratios of b components shown in the working examples and comparative examples in Table 3 and Table 4 were added to a twin-screw extrusion kneader, heated and mixed at 200° C. for 0.1 to 2 minutes, and then were formed into pellets to prepare flame retardant batches.

Preparation of Crosslinking Catalyst Batch (c Component)

Also, regarding the c component, the above-described commercially available products that are supplied in a pellet form in advance were used as the crosslinking catalyst batch.

Production of Insulated Electric Wire

Extrusion processing was performed by mixing, with a hopper of the extruder, the silane-grafted batch (a component), the flame retardant batch (b component), and the crosslinking catalyst batch (c component) in blending amount ratios shown in the working examples and comparative examples in Table 3 and Table 4, and setting the temperature of the extruder at approximately 140 to 200° C. In the extrusion processing, a coating material was formed by coating a conductor having an outer diameter of 2.4 mm with an insulator having a thickness of 0.7 mm as the extrusion coating (the outer diameter of the coating was 3.8 mm). Thereafter, an insulated electric wire was produced by performing water crosslinking treatment for 24 hours in a high humidity and high temperature bath having a temperature of 65° C. and a humidity of 95%.

The gel fraction, productivity, fusibility, ISO heat deformability, ISO abrasion resistance, flexibility, ISO chemical resistance, ISO flame-retardancy, and ISO long-term heatability of the obtained insulated electric wires were tested and evaluated. Evaluation results are also shown in Table 3 and Table 4. Note that testing methods and evaluation standards are as follows.

Gel Fraction

Gel fractions were measured in conformity with JASO-D608-92. That is, a sample that was collected from the coating material of the insulated electric wire resulting from water crosslinking was weighed to be approximately 0.1 g and was introduced into a test tube, 20 mL of xylene was added, and the mixture was heated in a thermostat oil bath having a temperature of 120° C. for 24 hours. Thereafter, the sample was removed, dried in a drier having a temperature of 100° C. for 6 hours, cooled down to normal temperature, and then the weight was precisely measured to obtain a gel fraction using a mass percentage with respect to the mass before testing. A sample having a gel fraction of 60% or more was regarded as good "⊚", a sample having a gel fraction of 50% or more was regarded as acceptable "○", and a sample having a gel fraction of less than 50% was regarded as not acceptable "x".

Productivity

A linear velocity was increased or decreased at the time of extrusion of an electric wire, a case where a designed outer diameter was obtained even at a linear velocity of 50 m/min or more was regarded as acceptable "○", and a case where a designed outer diameter was obtained even at a linear velocity of 100 m/min or more was regarded as good "⊚". Also, a case where a designed outer diameter was not obtained at a linear velocity of 50 m/min or more was regarded as not acceptable "x".

Fusibility

The insulated electric wire having an outer diameter of 600 mm after molding and before water crosslinking was wrapped around the reel, and water crosslinking was performed in a condition of 60° C., 12 hours, and 95% humidity, and then the insulated electric wire was drawn from the reel. At that time, a case where insulated electric wires were fused and a fusion mark was confirmed visually was regarded as not acceptable "x", and a case where insulated electric wires were not fused or no fusion mark was confirmed visually was regarded as acceptable "○".

ISO Heat Deformability

In conformity with ISO6722, a 0.7-mm blade was pressed at a load of 190 g against the insulated electric wire resulting from water crosslinking, the insulated wire was left in a thermostat bath having a temperature of 150° C. for 4 hours, and then was subjected to a voltage tolerance test in a 1% saline solution at 1 kv for 1 minute. At that time, a case where insulation break did not occur was regarded as acceptable "○", and a case where insulation break occurred was regarded as not acceptable "x". Also, in the case of being regarded as acceptable, a ratio of a thickness after the removal from the thermostat bath with respect to a cumulative thickness in the same direction of the insulating coatings (for example, in the case where one side was 0.7 mm, 0.7×2=1.4 mm) before the electric wire was introduced in the above-described thermostat bath was used as a remaining percentage (expressed by the following equation), and a case where the remaining percentage was 75% or more was regarded as good "⊚".

Remaining percentage (%)=(cumulative thickness after testing/cumulative thickness before testing)×100

ISO Abrasion Resistance

In conformity with ISO6722, an iron wire having an outer diameter of 0.45 mm was pressed at a load of 7N against the insulated electric wire resulting from water crosslinking, was moved back and forth at a speed of 55 movements/minutes, and the number of instances until the iron wire and copper that is the conductor electrically communicated with each other was measured, and a case where the number of instances was 700 or more was regarded as acceptable "○", a case where the number of instances was 1000 or more was regarded as good "⊚", and a case where the number of instances was less than 700 was regarded as not acceptable "x".

Flexibility

Three point bending flexibility was evaluated using Autograph AG-01 manufactured by Shimadzu Corporation, with reference to JISK7171. That is, the insulated electric wire resulting from water crosslinking was cut to have a length of 100 mm, the cut insulated wires were set on a jig in which a gap between columns was 50 mm, in a state in which the tips of the three cut wires that were arranged side by side were fixed with polyvinyl chloride tape, and a sample was pushed from above at the center of the columns at a speed of 1 mm/minute, and the maximum load was measured. A case where the load was 3 N or less was regarded as acceptable "○", and a case where the load was greater than 3 N was regarded as not acceptable "x".

ISO Chemical Resistance

Testing was performed in conformity with ISO chemical resistance method 2. The insulated electric wire resulting from water crosslinking was cut to have a length of 600 mm and immersed in a liquid mixture of toluene and 2,2,4-trimethyl pentane (mass ratio 50:50) at 20° C. for 20 hours, the insulated electric wire was removed, and the surface thereof was wiped gently with a Kimtowel (product name of paper wiper manufactured by NIPPON PAPER CRECIA Co., LTD.), left for 30 minutes, and then the outer diameter thereof was measured within 5 minutes. Based on the outer diameters before and after immersion, an outer diameter change ratio was obtained with the following equation, a case of being 15% or less was regarded as acceptable "○", and a case of being greater than 15% was regarded as not acceptable "x".

Outer diameter change ratio (%)=(outer diameter after immersion−outer diameter before immersion)/outer diameter before immersion×100

ISO Flame-Retardancy

In conformity with ISO6722, a case where fire was extinguished within 70 seconds was regarded as acceptable "○", and a case where fire was not extinguished within 70 seconds was regarded as not acceptable "x".

ISO Long-Term Heating Test

In conformity with ISO6722, after the insulated electric wire was subjected to an ageing test at 150° C. for 3000 hours, a voltage tolerance test was performed at 1 kv for 1 minute. As a result, a case where the insulated electric wire withstood the voltage tolerance test without insulation break was regarded as acceptable "○", and a case where it did not withstand was regarded as not acceptable "x".

As shown in Table 4, Comparative Examples 1 to 6 did not contain all components that are defined in the present application, and an insulated electric wire that satisfied all properties was not obtained. That is, compared to Working Example 1, in Comparative Example 1, because the density of a base polymer of the silane-grafted polyolefin was less than 0.855 g/cm$^3$, the gel fraction, fusibility, ISO heat deformability, ISO abrasion resistance, ISO chemical resistance, and the like were not acceptable. In Comparative Example 2, because the density of a base polymer of the silane-grafted polyolefin exceeded 0.885 g/cm$^3$, the bromine-based flame retardant and antimony trioxide were not included, and the flexibility and ISO flame-retardancy were not acceptable. In Comparative Example 3, because the density of the unmodified polyolefin exceeded 0.955 g/cm$^3$, and zinc oxide, zinc sulfide, an imidazole compound, a lubricant, and the like were not included, the gel fraction, fusibility, ISO heat deformability, flexibility, ISO flame-retardancy, and ISO long-term heating test were not acceptable. In Comparative Example 4, because the density of the unmodified polyolefin exceeded 0.955 g/cm$^3$, and antimony trioxide, a lubricant, and the like were not included, the productivity and flexibility were not acceptable. Because Comparative Example 5 did not contain the crosslinking catalyst batch, the gel fraction, fusibility, ISO heat deformability, and ISO long-term heating test were not acceptable. Because Comparative Example 6 did not contain the silane-grafted polyolefin, all items excluding the ISO abrasion resistance and ISO chemical resistance were not acceptable.

In contrast, as shown in Table 3, because Working Examples 1 to 7 contained each component defined in the present application, it was possible to obtain insulated electric wires in which evaluations of the gel fraction, productivity, flame-retardancy, ISO heat deformability, ISO abrasion resistance, flexibility, ISO chemical resistance, ISO flame-retardancy, and ISO long-term heating test were all acceptable.

Although an embodiment of the present invention was described in detail above, the present invention is not merely limited to the above-described embodiment, and it will be appreciated that various modifications can be made without departing from the gist of the present invention.

TABLE 3

| | Component ratio (parts by mass) | | | | | | | |
|---|---|---|---|---|---|---|---|---|
| | Work. Ex. 1 | | Work. Ex. 2 | | Work. Ex. 3 | | Work. Ex. 4 | |
| | b comp. | a comp. | b comp. | a comp. | b comp. | a comp. | b comp. | a comp. |
| Silane-grafted PE1 | | | | | | | | |
| Silane-grafted PE2 | | | 40 | | 60 | | | |
| Silane-grafted PE3 | | | | | | | 90 | |
| Silane-grafted PE4 | | | | | | | | 60 |
| Silane-grafted PE5 | | | | | | | | |
| Silane-grafted PP1 | | | | | | | | |
| PP elastomer | 10 | | | | | | 5 | |
| Unmodified PE1 | | | | | | | | |
| Unmodified PE2 | 50 | | 30 | | | | | |
| Unmodified PE3 | | | | | 5 | | 30 | |
| Unmodified PE4 | | | | | | | | |
| Maleic acid-modified PE | | | 10 | | | | 5 | |
| Epoxy-modified PE | 10 | | | | | | | |
| Maleic acid-modified PP | | | | | 5 | | | |
| Methacryl-modified PE | | | | | | | | |
| Bromine-based flame retardant 1 | | | | | | | | |
| Bromine-based flame retardant 2 | | | 5 | | | | 10 | |

TABLE 3-continued

|  | b | a | b | a | b | a | b | a |
|---|---|---|---|---|---|---|---|---|
| Bromine-based flame retardant 3 | 100 | | 5 | | 20 | | 30 | |
| Antimony trioxide | 5 | | 3 | | 10 | | | |
| Magnesium hydroxide | | | 30 | | | | | |
| Calcium carbonate | | | | | | | | |
| Antioxidant 1 | 1.5 | | 3 | | 1.5 | | 1.5 | |
| Antioxidant 2 | 1.5 | | 3 | | 1.5 | | 1.5 | |
| Metal deactivator | 1 | | 1 | | 1 | | 1 | |
| Zinc oxide | 5 | | 1 | | 7 | | | |
| Zinc sulfide | | | | | | | 5 | |
| Imidazole compound | 5 | | 1 | | 7 | | 5 | |
| Lubricant 1 | 1 | | | | | | 1 | |
| Lubricant 2 | | | 1 | | | | | |
| Lubricant 3 | | | | | 1 | | | |
| Lubricant 4 | | | | | | | | |
| Subtotal | 190 | 40 | 93 | 60 | 59 | 90 | 96 | 60 |
| Crosslinking catalyst batch (c component) | | 2 | | 5 | | 20 | | 5 |
| Total (a + b + c) | 232 | | 158 | | 169 | | 161 | |
| Gel fraction | ◎ | | ○ | | ◎ | | ◎ | |
| Productivity | ◎ | | ◎ | | ◎ | | ◎ | |
| Fusibility | ○ | | ○ | | ○ | | ○ | |
| ISO heat deformability | ○ | | ◎ | | ◎ | | ○ | |
| ISO abrasion resistance | ○ | | ◎ | | ◎ | | ○ | |
| Flexibility | ○ | | ○ | | ○ | | ○ | |
| ISO chemical resistance | ○ | | ○ | | ○ | | ○ | |
| ISO flame-retardancy | ○ | | ○ | | ○ | | ○ | |
| ISO long-term heating test | ○ | | ○ | | ○ | | ○ | |

| | Component ratio (parts by mass) | | | | | | | |
|---|---|---|---|---|---|---|---|---|
| | Work. Ex. 5 | | Work. Ex. 6 | | Work. Ex. 7 | | Work. Ex. 8 | |
| | b comp. | a comp. | b comp. | a comp. | b comp. | a comp. | b comp. | a comp. |
| Silane-grafted PE1 | | | | | | | | |
| Silane-grafted PE2 | | | 50 | | | | | |
| Silane-grafted PE3 | | | | | 60 | | | 40 |
| Silane-grafted PE4 | | | | | | | | 40 |
| Silane-grafted PE5 | | 60 | | | | | | |
| Silane-grafted PP1 | | | | | | | | |
| PP elastomer | | | | | | | | |
| Unmodified PE1 | | | | | | | | |
| Unmodified PE2 | 30 | | | | 30 | | | |
| Unmodified PE3 | 5 | | 20 | | | | 10 | |
| Unmodified PE4 | | | | | | | | |

TABLE 3-continued

| | | | | |
|---|---|---|---|---|
| Maleic acid-modified PE | 5 | | 5 | 10 |
| Epoxy-modified PE | | | | |
| Maleic acid-modified PP | | 30 | | |
| Methacryl-modified PE | | | 5 | |
| Bromine-based flame retardant 1 | 15 | 10 | 30 | 10 |
| Bromine-based flame retardant 2 | 15 | | | 10 |
| Bromine-based flame retardant 3 | | 5 | | 10 |
| Antimony trioxide | 20 | 70 | 10 | 10 |
| Magnesium hydroxide | | 50 | | |
| Calcium carbonate | 20 | | | |
| Antioxidant 1 | 1.5 | 1.5 | | 1.5 |
| Antioxidant 2 | 1.5 | 1.5 | 3 | 1.5 |
| Metal deactivator | 1 | 1 | 1 | 1 |
| Zinc oxide | | | 10 | |
| Zinc sulfide | 10 | 15 | | 5 |
| Imidazole compound | | | 10 | |
| Lubricant 1 | 1 | | 1 | |
| Lubricant 2 | | 1 | | |
| Lubricant 3 | | | | |
| Lubricant 4 | | | | |
| Subtotal | 125    60 | 205    50 | 105    60 | 70    80 |
| Crosslinking catalyst batch (c component) | 5 | 5 | 5 | 5 |
| Total (a + b + c) | 190 | 260 | 170 | 155 |
| Gel fraction | ○ | ○ | ◎ | ◎ |
| Productivity | ○ | ◎ | ◎ | ○ |
| Fusibility | ○ | ○ | ○ | ○ |
| ISO heat deformability | ○ | ○ | ◎ | ◎ |
| ISO abrasion resistance | ○ | ◎ | ◎ | ○ |
| Flexibility | ○ | ○ | ○ | ○ |
| ISO chemical resistance | ○ | ○ | ○ | ○ |
| ISO flame-retardancy | ○ | ○ | ○ | ○ |
| ISO long-term heating test | ○ | ○ | ○ | ○ |

TABLE 4

| | Component ratio (parts by mass) | | | | | | | | | | | |
|---|---|---|---|---|---|---|---|---|---|---|---|---|
| | Comp. Ex. 1 | | Comp. Ex. 2 | | Comp. Ex. 3 | | Comp. Ex. 4 | | Comp. Ex. 5 | | Comp. Ex. 6 | |
| | b comp. | a comp. | b comp. | a comp. | b comp. | a comp. | b comp. | a comp. | b comp. | a comp. | b comp. | a comp. |
| Silane-grafted PE1 | | 40 | | | | | | | | | | |
| Silane-grafted PE2 | | | | | | 15 | | | | | | |
| Silane-grafted PE3 | | | | | | | | | | 60 | | |
| Silane-grafted PE4 | | | | | | | | | | | | 60 |
| Silane-grafted PE5 | | | | | | | | | | | | |
| Silane-grafted PP1 | | | | 60 | | | | | | | | |
| PP elastomer | 10 | | | | | | | | | | | |
| Unmodified PE1 | 50 | | | | | | | | 5 | | | |
| Unmodified PE2 | | | 30 | | | | | | 30 | | | |
| Unmodified PE3 | | | | | | | | | | | 100 | |
| Unmodified PE4 | | | | | 80 | | | | | | | |
| Unmodified PP1 | | | | | | | 40 | | | | | |
| maleic acid-modified PE | | | 10 | | | | 5 | | 5 | | | |
| Epoxy-modified PE | 10 | | | | | | | | | | | |
| Maleic acid-modified PP | | | | | 5 | | | | | | | |
| Methacryl-modified PE | | | | | | | | | | | | |
| Bromine-based flame retardant 1 | | | | | | | | | | | | |
| Bromine-based flame retardant 2 | | | | | | | 50 | | | | | |
| Bromine-based flame retardant 3 | 100 | | | | 20 | | 20 | | 10 | | | |
| Antimony trioxide | 5 | | | | 10 | | | | 20 | | | |
| Magnesium hydroxide | | | 30 | | | | | | | | 50 | |
| Calcium carbonate | | | | | | | | | 20 | | | |
| Antioxidant 1 | 1.5 | | 3 | | 1.5 | | 1.5 | | 1.5 | | 1.5 | |
| Antioxidant 2 | 1.5 | | 3 | | 1.5 | | 1.5 | | 1.5 | | 1.5 | |
| Metal deactivator | 1 | | 1 | | 1 | | 1 | | 1 | | 1 | |
| Zinc oxide | 5 | | 1 | | | | | | | | | |
| Zinc sulfide | | | | | | | | | 5 | | 10 | 15 |
| Imidazole compound | 5 | | 1 | | | | | | | | | |
| Lubricant 1 | 1 | | | | | | | | | | 1 | |
| Lubricant 2 | | | 2 | | | | | | 1 | | | |
| Lubricant 3 | | | | | | | | | | | | |
| Lubricant 4 | | | | | | | | | | | | |
| Subtotal | 190 | 40 | 81 | 60 | 119 | 15 | 124 | 60 | 105 | 60 | 170 | — |
| Crosslinking catalyst batch (c component) | | 2 | | 5 | | 20 | | 5 | | — | | 5 |
| Total (a + b + c) | 232 | | 146 | | 154 | | 189 | | 165 | | 175 | |
| Gel fraction | X | | ○ | | X | | ○ | | X | | X | |
| Productivity | ○ | | ○ | | ◎ | | X | | ◎ | | X | |
| Fusibility | X | | ○ | | X | | ○ | | X | | X | |
| ISO heat deformability | X | | ○ | | X | | ○ | | X | | X | |
| ISO abrasion resistance | X | | ○ | | ◎ | | ○ | | ○ | | ○ | |
| Flexibility | ○ | | X | | X | | X | | ○ | | X | |
| ISO chemical resistance | X | | ○ | | ○ | | ○ | | ○ | | ○ | |
| ISO flame-retardancy | ○ | | X | | X | | ○ | | ○ | | X | |
| ISO long-term heating test | ○ | | ○ | | X | | ○ | | X | | X | |

The invention claimed is:

1. A composition for an electric wire coating material comprising:
   (A) a silane-grafted polyolefin obtained by grafting a silane coupling agent onto a polyolefin having a density of 0.855 to 0.885 g/cm$^3$, wherein the polyolefin before silane grafting has a density of 0.865 to 0.885 g/cm$^3$, a degree of crystallinity of 10 to 25%, a melt flow rate at 190° C. under a load of 2.16 kg of 0.5 to 5 g/10 minutes, a Shore A hardness of 55 to 80, a flexural modulus of 3 to 50 MPa, and a gel fraction of the silane-grafted polyolefin is 80 to 95%;
   (B) an unmodified polyolefin having a density of 0.890 to 0.955 g/cm$^3$, a melt flow rate at 190° C. under a load of 2.16 kg of 0.5 to 5 g/10 minutes, a flexural modulus of 50 to 1000 MPa, and a density of 0.910 to 0.930 g/cm$^3$;
   (C) a modified polyolefin modified by one or more functional groups selected from a carboxylic acid group, an acid anhydride group, an amino group, an acrylic group, a methacrylic group, and an epoxy group;
   (D) a bromine-based flame retardant and antimony trioxide, the bromine-based flame retardant having a melting point of 200° C. or more, or being either ethylene bis(tetrabromophthalimide) or ethylene bis(pentabromophenyl);
   (E) a crosslinking catalyst;
   (F) zinc oxide and an imidazole-based compound, or zinc sulfide;
   (G) an antioxidant comprised of hindered phenol having a melting point of 200° C. or more;
   (H) a metal deactivator comprised of a salicylic acid derivative; and
   (I) a lubricant comprised of one or more selected from derivatives of erucic acid, oleic acid, and stearic acid, or polyethylene-based paraffin wax.

2. The composition for an electric wire coating material according to claim 1, wherein the composition contains:

the (A) silane-grafted polyolefin in an amount of 30 to 90 parts by mass, the (B) unmodified polyolefin and the (C) modified polyolefin in an amount of 10 to 70 parts by mass in total, with respect to 100 parts by mass of the total of the (A), (B), and (C), the (D) bromine-based flame retardant and antimony trioxide in an amount of 10 to 70 parts by mass in total, as the (E) crosslinking catalyst, a crosslinking catalyst batch in an amount of 2 to 20 parts by mass, the crosslinking catalyst batch comprising a dispersion containing the crosslinking catalyst in an amount of 0.5 to 5 parts by mass with respect to 100 parts by mass of a polyolefin, the (F) zinc oxide and imidazole-based compound each in an amount of 1 to 15 parts by mass, or zinc sulfide in an amount of 1 to 15 parts by mass, the (G) antioxidant in an amount of 1 to 10 parts by mass, the (H) metal deactivator in an amount of 1 to 10 parts by mass, and the (I) lubricant in an amount of 1 to 10 parts by mass.

3. The composition for an electric wire coating material according to claim 1, wherein:

the silane-grafted polyolefin and the unmodified polyolefin are one or more selected from very-low-density polyethylene, linear low-density polyethylene, and low-density polyethylene.

4. An insulated electric wire comprising an electric wire coating material obtained by subjecting the composition for an electric wire coating material according to claim 1 to water crosslinking.

5. The insulated electric wire according to claim 4, wherein:

the composition for an electric wire coating material according to claim 1 comprises:

an a component containing the (A) silane-grafted polyolefin;

a b component containing the (B) unmodified polyolefin, the (C) modified polyolefin, the (D) bromine-based flame retardant and antimony trioxide, the (F) zinc oxide and imidazole-based compound, or zinc sulfide, the (G) antioxidant, the (H) metal deactivator, and the (I) lubricant; and a c component containing the crosslinking catalyst batch of the (E) crosslinking catalyst, the a component, the b component, and the c component being mixed and molded as the electrical wire coating material, and the molded electrical wire coating material being subjected to water crosslinking.

6. A wire harness comprising:

the insulated electric wire according to claim 4.

* * * * *